(12) United States Patent  
Ducret

(10) Patent No.: US 8,191,266 B2
(45) Date of Patent: Jun. 5, 2012

(54) SHIELDED CONDUIT CUTTING DEVICE FOR SMALL BX ELECTRICAL CABLES

(75) Inventor: Lucien C. Ducret, Stamford, CT (US)

(73) Assignee: Seatek Co., Stamford, CT (US)

( * ) Notice: Subject to any disclaimer, the term of this patent is extended or adjusted under 35 U.S.C. 154(b) by 580 days.

(21) Appl. No.: 11/507,393

(22) Filed: Aug. 22, 2006

(65) Prior Publication Data

US 2008/0047147 A1    Feb. 28, 2008

(51) Int. Cl.
  *B21F 13/00*    (2006.01)
  *H02G 1/12*    (2006.01)
(52) U.S. Cl. .............................. 30/90.4; 30/90.6; 30/91.1
(58) Field of Classification Search ................... 30/90.4, 30/90.7, 90.8, 90.9, 91.1; 83/13, 745; 81/9.4
See application file for complete search history.

(56) References Cited

U.S. PATENT DOCUMENTS

| 2,559,387 | A | * | 7/1951 | Baker | 83/438 |
| 3,851,387 | A | | 12/1974 | Ducret | |
| 4,359,819 | A | | 11/1982 | Ducret | |
| 4,769,909 | A | | 9/1988 | Ducret | |
| 4,977,671 | A | * | 12/1990 | Ducret | 30/90.2 |
| 5,337,479 | A | * | 8/1994 | Ducret | 30/90.6 |
| 6,044,744 | A | * | 4/2000 | Eslambolchi et al. | 83/880 |
| 6,662,450 | B1 | * | 12/2003 | Ducret | 30/90.4 |

* cited by examiner

Primary Examiner — Ghassem Alie

(57) ABSTRACT

A cutting device for relatively small cable including, among others, fiber optic cable and BX electrical cable is configured with removably coupleable adapter inserted between the top and bottom portions of the device which pivot relative to one another so as to displace a cutter to a cutting position. The adapter is configured to reduce a cable receiving space formed in the bottom portion of the device so as to center a small cable relative to the cutter which is operative to split the shield of the cable without damaging electrical conductors of the cable.

6 Claims, 7 Drawing Sheets

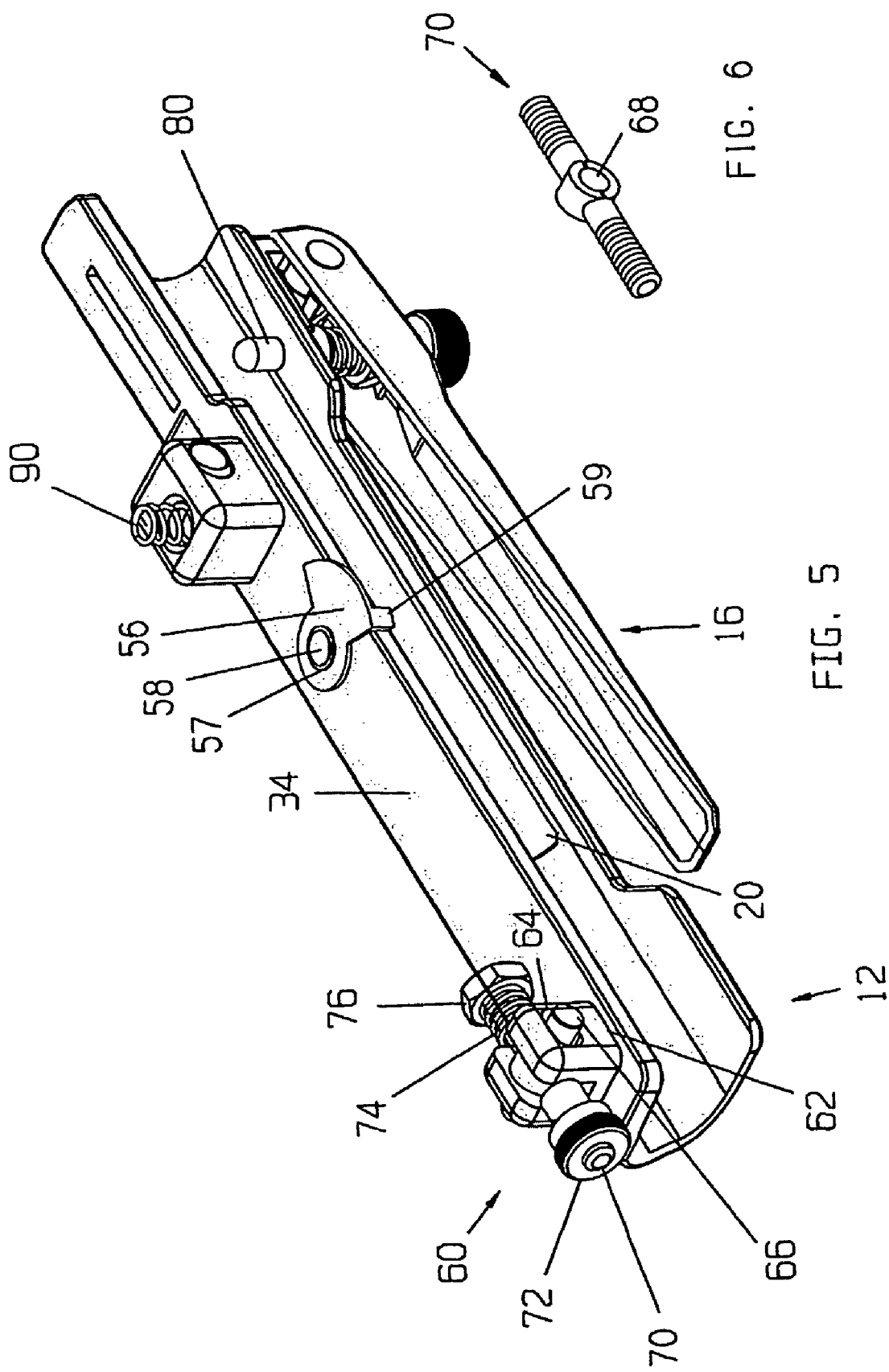

SHIELDED CONDUIT CUTTING DEVICE FOR SMALL BX ELECTRICAL CABLES

BACKGROUND OF THE INVENTION

1. Field of the Invention

This invention relates to a hand-held tool for cutting a small BX cable and the like. It relates specifically to an improvement in the means for centering a small BX cable in the tool relative to a blade, controlling penetration of the blade and splitting the shield of the small BX without nicking the conductors regardless of the longitudinal position of the BX cable in the hand-held tool.

2. Related Prior Art

Cutting devices for processing shielded BX/MC cables are well known and disclosed by, among others, U.S. Pat. Nos. 3,851,387; 4,359,819 and 4,769,909 all commonly owned with the present invention and fully incorporated herein by reference. The devices, as disclosed in the above-mentioned patents, are broadly used for cutting regular-size shielded BX(MC cables. A shielded BX/MC cable is configured with a core of electrical conductors wrapped by a helix-shaped strip or shield of formed metallic material.

The advanced manufacturing equipment is associated with cables having significantly reduced outer diameter. By reducing the outer diameter of the cable's shield, less material is being used per foot for manufacturing BX and fiber optic cables. Concomitantly, the reduction of the shield's overall size leads to the tight core of the small size cables.

These characteristics of a small diameter cable sometime require that the user manually center such a cable on the tool. If the mounted cable is not properly centered, the cutting blade of the tool may uncontrollably penetrate the cable's shield and damage the core. Furthermore, even if the user successfully centers the mounted cable, due to a small size and tight core, a blade still may penetrate deep into the shield and damage the core.

A need, therefore, exists for cutting devices that are configured to process BX electrical and fiber optic cables having a relatively small outer diameter in a time-effective and reliable manner.

Another need exists for cutting devices that are configured to center small diameter BX and other types of cables to split the shield of the mounted cable without damaging its electrical conductors.

Still another need exists for cutting devices that have a simple depth penetration control system.

A further need exists for cutting devices that have a mechanism operative to establish the desired linear position of the cutting blade relative to the cable to be processed.

SUMMARY OF THE INVENTION

These needs are met by the inventive cutting tool operable to center small-size BX, fiber optic and other cables so that a circular blade penetrates the shield of cable along the cable's central line in a controlled manner preventing the cable's electrical conductors from being damaged.

In accordance with one aspect of the invention, a cutting device is configured to split a helix-shaped shield of formed metallic material protecting a core of electrical conductors of cables which are variously dimensioned. Accordingly, the inventive device is operable to cut the shield of relatively large cables and, after being retrofitted with a specifically configured adapter, can effectively split the shield of relatively small cables. The adapter is removably coupleable to the bottom portion of the device and configured to decrease a cable receiving space formed in the bottom portion. The decrease of the cable receiving space leads to centering of the small cable relative a cutting blade and allows the latter to produce an accurate cut.

In accordance with another aspect of the invention, the cutting device operable to produce cuts in the shield of small cables is configured with a first displacement control unit regulating the penetration depth of cutting blade into the shield. The first displacement control unit includes a shim stop displaceably mounted between the top and bottom portions of the device and operable to controllably prevent angular displacement of the portions relative to one. As a result, the cutting blade displaceably fixed to the top portion of the device is prevented from producing a deep cut and nicking the core of the small cable.

In a further aspect, the inventive device has a second displacement control unit operable to linearly displace a cutting blade, which is supported by one of two casting portions of the device, relative to the other casting portion so as to establish the desired linear position of the cutting blade relative to the shield of cable to be processed. The second displacement control unit is coupled to both portions of the inventive device and is configured with a dial actuator and a damping mechanism providing smooth controlled displacement of the cutting blade to the desired position. In the desired longitudinal position, the cutting blade is enabled to uniformly split one convolution of each of the shield's opposite ends without touching or nicking the cable's core.

BRIEF DESCRIPTION OF THE DRAWINGS

The above and other features and advantages of the invention will become more apparent from the following specific description taken in conjunction with the drawings, in which;

FIG. 5 is a top-side orthogonal view of the inventive device illustrated with a top portion thereof removed and configured in accordance with another embodiment of the inventive device, wherein the bottom portion is provided with a second displacement control unit operative to adjust a longitudinal position of a cutting blade relative to a cable to be processed;

FIG. 6 is a view of a double-ended eye bolt of the second displacement control unit;

SPECIFIC DESCRIPTION

Figure 1:
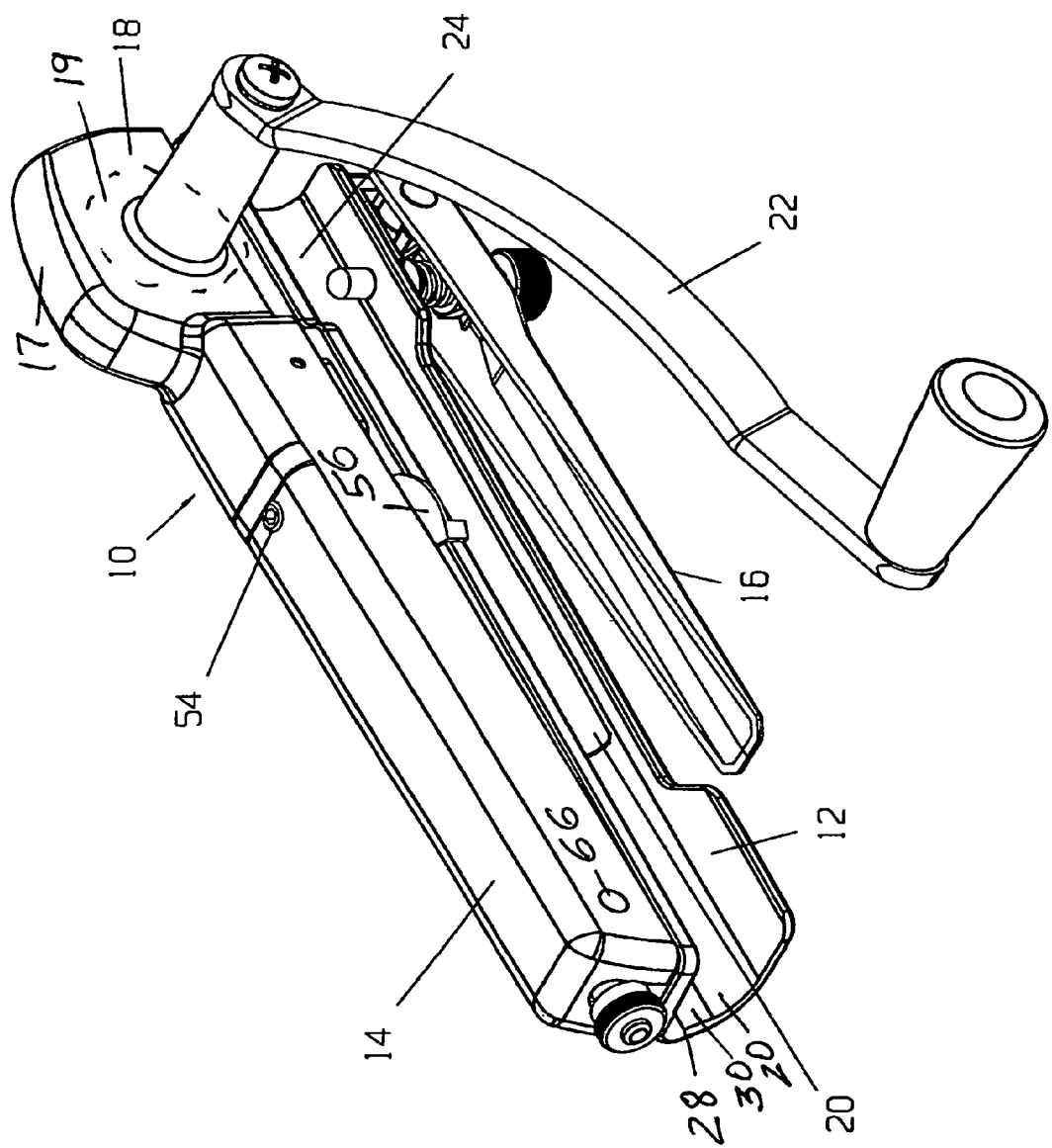
FIG. 1 is a top-side orthogonal view of the inventive cutting device.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, inner, outer, above, below, beneath, rear, and front may be used with respect to the drawings. These and similar directional terms should not be construed to limit the scope of the invention in any manner. The word "couple," and similar terms with their inflectional morphemes do not necessarily denote direct and immediate connections, but also include connections through mediate elements or devices.

A cutting device 10 illustrated in FIG. 1 is configured with a bottom portion 12, a top portion 14 pivotally mounted to the proximal end of bottom portion 12 on a pin 66 and provided with a cutter 18, and a clamping handle 16. The device 10 is operative to receive variously dimensioned cables (not shown) in a cable receiving space 24 formed in the distal portion of bottom portion 12. When a cable is received, the user applies a force to handle 16 for clamping a cable sufficient to pivot top portion 14 towards base portion 12 leading to splitting a shield of cable by cutter 18 which may be actuated manually by an actuator 22 or by a motorized unit that is not illustrated but readily understood by those skilled in the art.

The device 10 is a hand-held tool particularly effective for splitting the shield of cables that have a relatively large outer diameter. When a cable having a relatively small diameter not be perfect since the small cable is not properly centered relative to cutter 18. The cutter 18 is configured with a housing 17 coupled to top portion 14, a saw blade 19 which is rotatably mounted in the housing on shaft 21 that, in turn, coupled to handle 22.

In accordance with the invention, device 10 may be retrofitted or specifically manufactured anew by utilizing an adapter 20 removably and slidably insetrtable between top portion 14 and bottom portion 12 and configured to reduce cable receiving space 24, as will be disclosed in detail hereinbelow.

Figure 2:
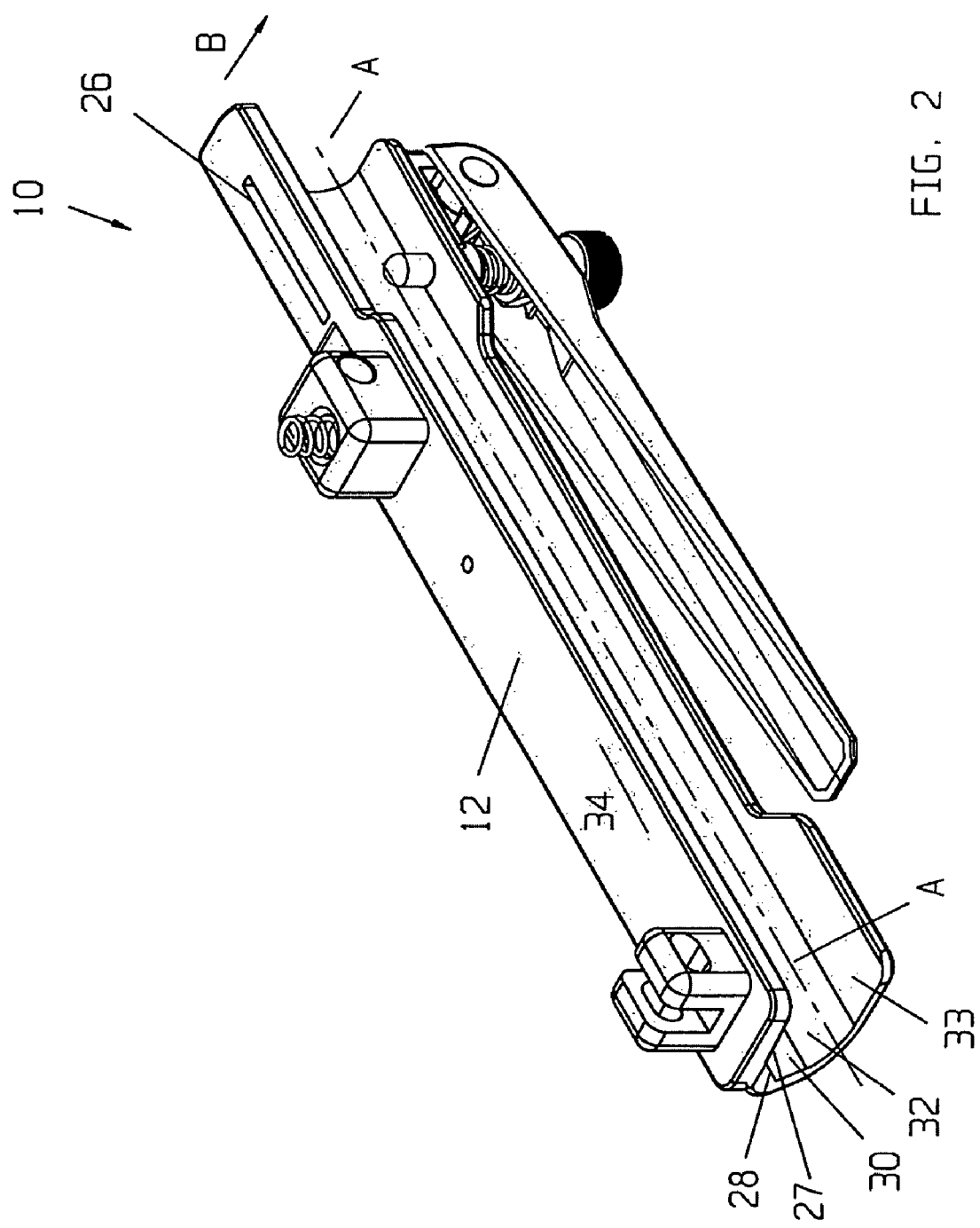
FIG. 2 is a top-side orthogonal view of the inventive device illustrated with a top potion thereof removed and configured in accordance with one embodiment of the invention.

Turning to FIG. 2 in addition to FIG. 1, bottom portion 12 of device 10 preferably has a generally C-shaped or U-shaped body including substantially parallel top and bottom sides 34 and 32, respectively, and one or more bridging sides 27, 28, 30 and 33. The sides of portion 12 define a trough opening laterally relative to a longitudinal axis A-A of bottom portion 12 in a normal cutting position and shaped with an inner surface extending complementary to the portion of the cable's outer periphery after the latter has been inserted into the trough. When the cable is properly centered, cutter 18 including a rotary blade extends through a slot 26 of top side 34 and splits the cable's shield along the cable's axis of symmetry minimizing, thus, the possibility of damaging electrical connectors of the cable.

Figure 3:
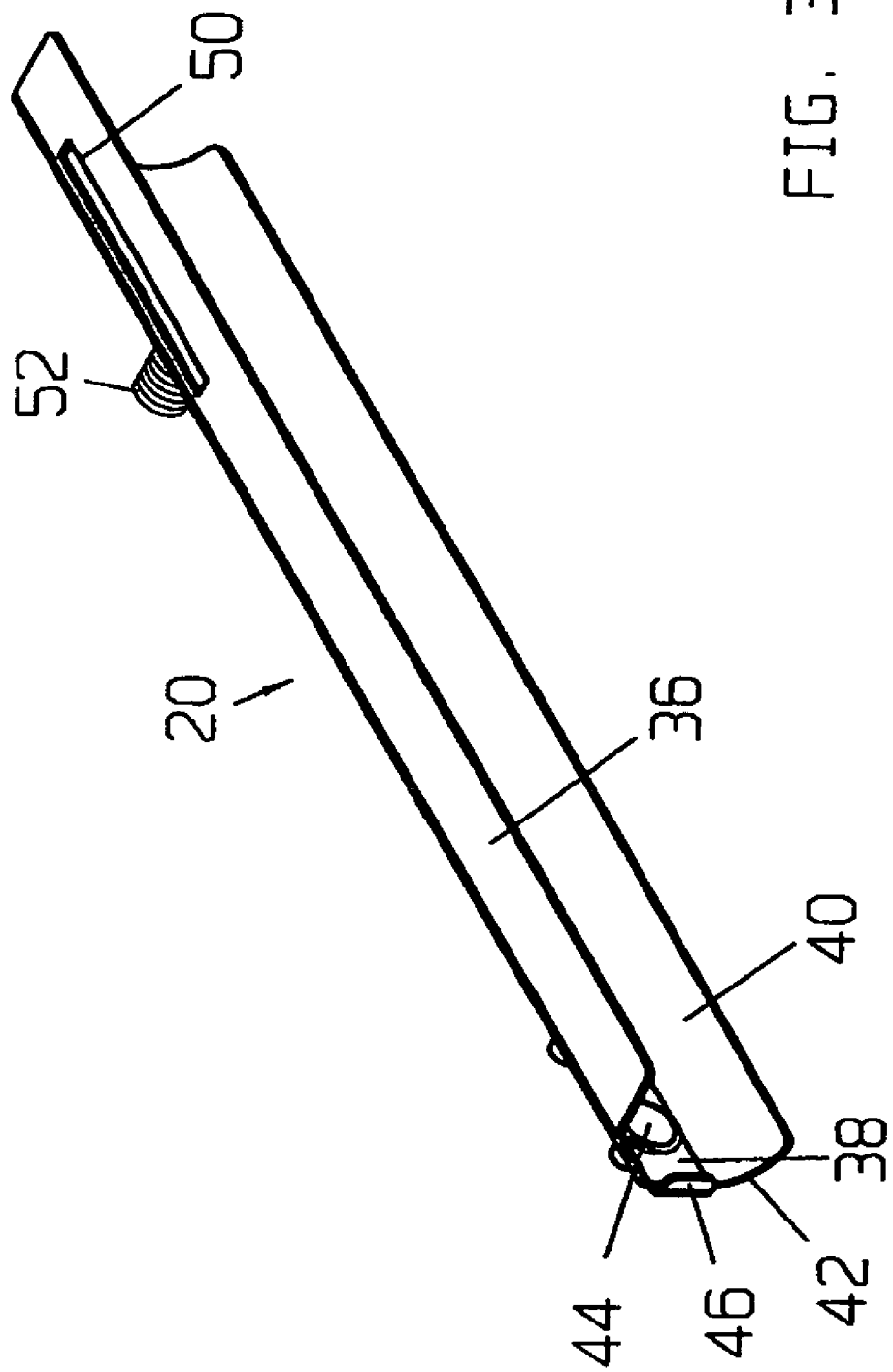
FIG. 3 is a top-side orthogonal view of an adapter configured to reduce a cable receiving spaced in a bottom portion of the inventive device.

The adapter 20, as shown in FIG. 3, is formed with a peripheral surface including top, at least one intermediary and bottom sides 35, 36, 38 and 40, respectively. The shape of adapter 20 is configured so that its sides 35, 36, 38 and 40 extend substantially complementary to inner surfaces of sides 34, 28 and 30, respectively, of bottom portion 12 when adapter 20 is slidably inserted within the trough of this portion 12, as shown in dash lines in FIG. 1. The configuration of adapter 20 causes a subsequently received cable to be laterally displaced in a direction B, as illustrated in FIG. 2 and assume the desired position in which the cable extends concentrically with the trough of bottom portion 12. As a consequence, the cutter 18 (FIG. 1) penetrates slot 26 (FIG. 2) and splits the shield of the cable substantially along the cable's axis of symmetry.

Figure 8:
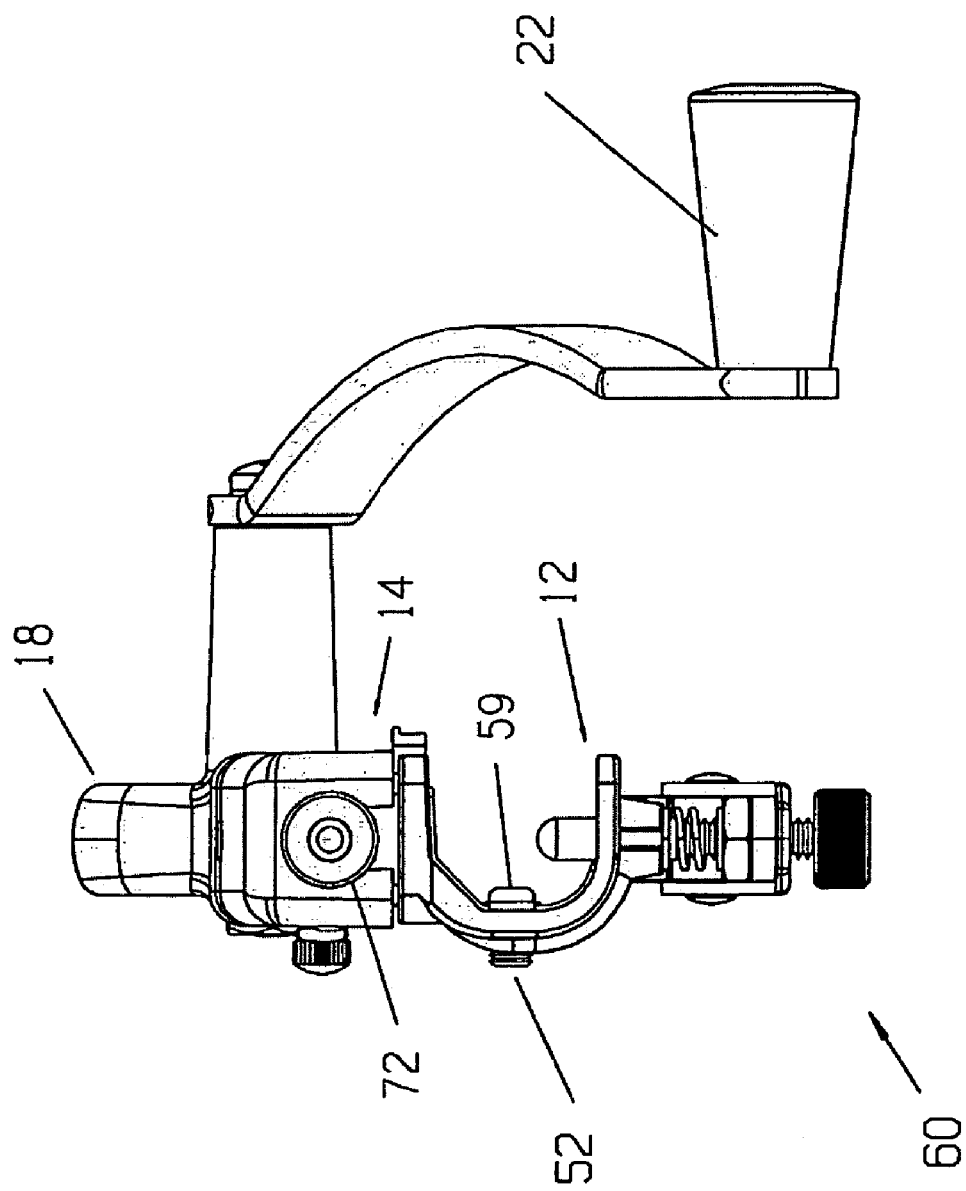
FIG. 8 is a rear view of the device shown in FIG. 1.

A proximal end 42 of adapter 20 has one or more friction elements 44 extending from the outer surface of adapter 20 towards the inner surface of bottom portion 20 and generating friction therewith as adapter 20 is being displaced from the proximal end of bottom portion 20 towards the distal end of this portion. The friction elements 44 are configured so that voluntary displacement between adapter 20 and bottom portion 12 is prevented in a fully installed position of the adapter. By way of example, friction elements may include rivets, friction washers, pins, screws, studs and the like and extend from intermediate side 38 of adapter 20. However, the outer surface of any of the adapter's sides may have friction elements 44. A tab 46 on proximal end 42 of adapter 20 is configured to facilitate the sliding motion of adapter 20 from portion 12 upon applying a force by the user. A distal end of adapter 20 has a slot 50 aligned with slot 26 (FIG. 2) of bottom portion 12 when the adapter is fully mounted thereto. To allow the user to finely adjust the desired position of adapter 20 in bottom portion 12, the distal end of adapter 20 is provided with an adjustable screw 52 that, in the assembled state of the inventive device, fits into bottom portion 12, as better seen in FIG. 8. By actuating screw 52, the user causes adapter 20 to move laterally within portion 12 until slots 26 and 50 of portion 12 and adapter 20, respectively, are aligned.

Figure 4:
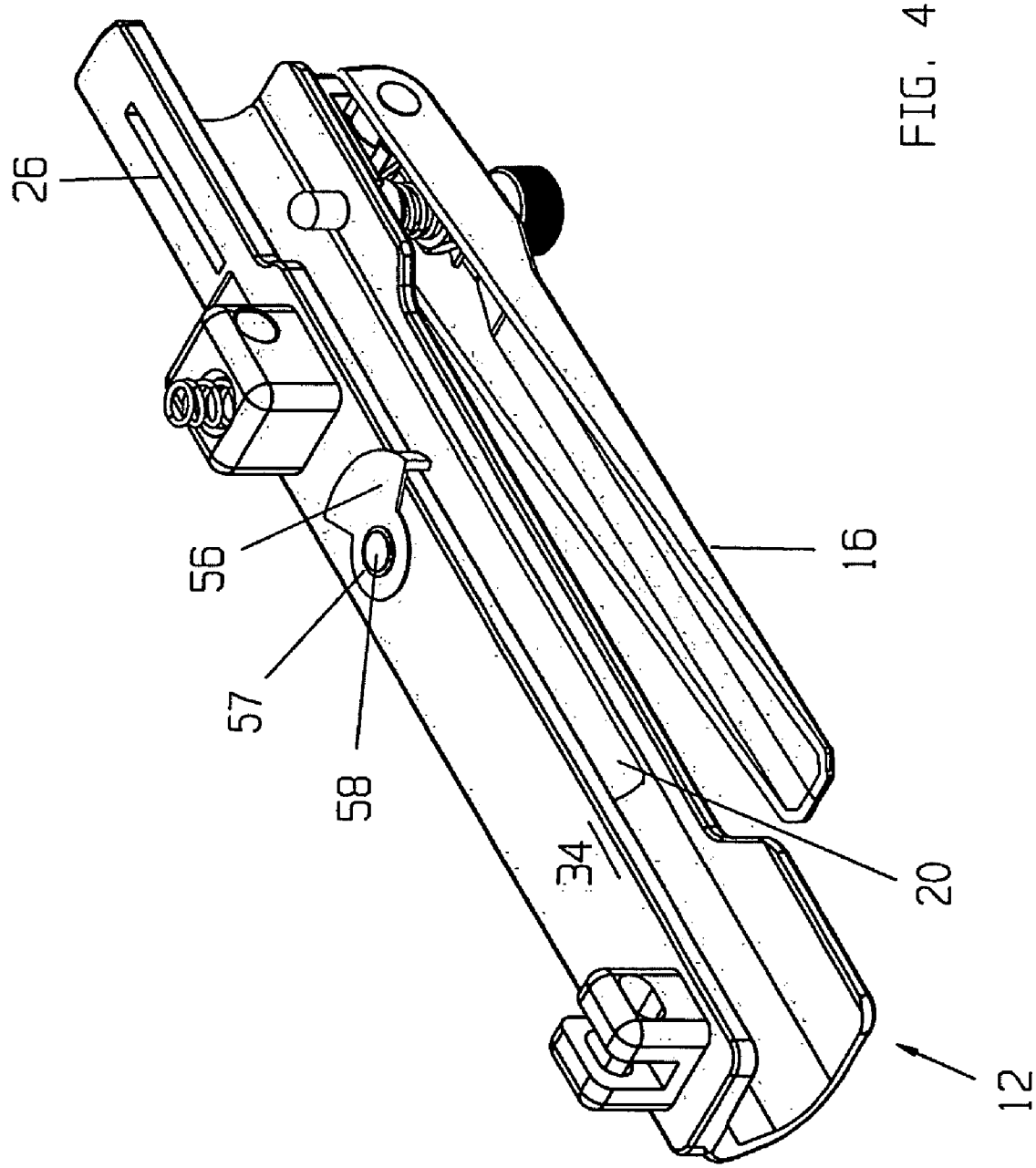
FIG. 4 is a top-side orthogonal view and a side view of the inventive device illustrated with a top potion thereof removed and configured in accordance with another embodiment of the inventive device, wherein the bottom portion has a first displacement control mechanism operative to limit angular displacement of the top portion and cutter of the device relative to the bottom portion and control a depth of blade penetration of the cutter into a cable.
Figure 7:
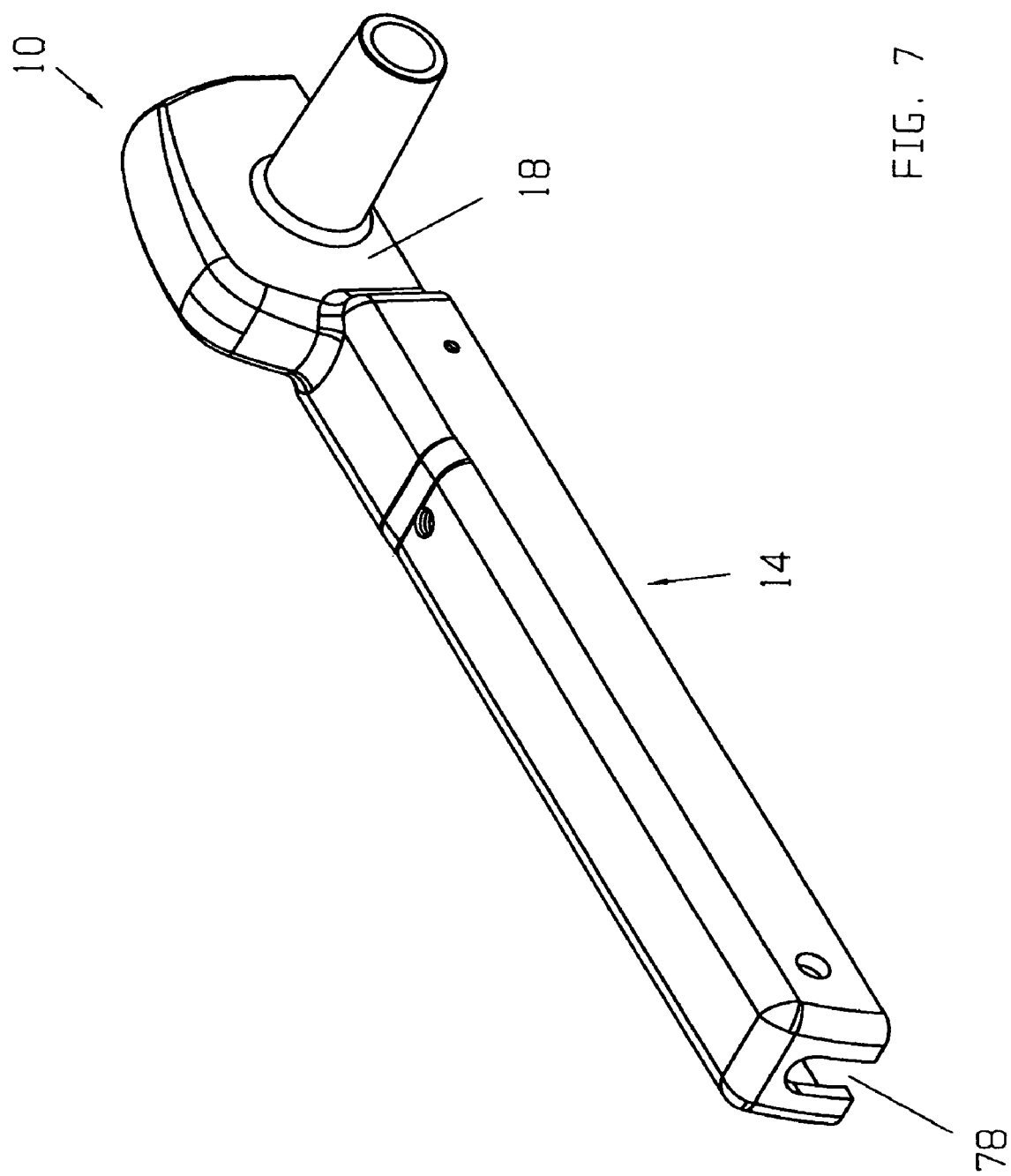
FIG. 7 is a top-side orthogonal view of the top portion of the inventive device.

Referring to FIGS. 1 and 4, to establish the desired depth of penetration of cutter 18 into the affixed cable, top portion 14 of device 10 has a cut stop 54 that controllably stops displacement of cutter 18 before it reaches the core of a cable as disclosed in the above-mentioned prior art references. However, with relatively small cables, stop 54 may not be fully effective. To ensure that the cable's core is intact, top surface 34 of bottom portion 12 has a first control displacement unit which includes shim stop 56 rotatable about a rivet 57 and friction washer 58 between multiple angular positions thereof in response to a force applied to it by the user. The shim stop 56 is so configured that in one of its opposite extreme positions, as shown, for example, in FIG. 4, stop 54 is displaced to one of extreme angular positions thereof. As a result, the stroke of the rotary blade of cutter 18 is reduced to prevent the damage to the core of relatively small cables. Upon rotating shim stop 56 about an axis 58 to the other extreme position, as shown in FIG. 5, stop 54 when displaced presses against surface 34 of bottom portion 12 because of the cut on shim 56. Accordingly, the stroke of the cutter is increased allowing the blade penetrate the shield of the cable to be cut at a greater depth required by relatively large cables. Of course, the user may select any of multiple angular positions of shim stop 56 so as to finely adjust the desired depth of cutter's penetration. Alternatively, instead of shim stop 56, a sliding stop can be implemented. Similar to the rotational configuration, the axially sliding shim is configured to selectively stop pivotal motion of top portion 14 at multiple desired positions of the shim.

Once adapter 20 (FIG. 3) is installed in the desired position characterized by alignment between slots 26 and 50 of portion 12 and adapter 20, respectively, and the desired depth of the cutter's penetration is set, the user grasps handle 16 and brings top portion 14 (FIG. 1) towards bottom portion 12. The blade of cutter 18 traverses aligned slots 26 and 50 and splits the shield of the cable without touching or nicking the electrical conductors.

In addition to centering a small cable relative to cutter 18 and establishing the desired depth of penetration of cutter 18, a longitudinal position of the cutting blade relative the mounted cable is equally important for producing a complete split of one convolution of the cable's shield without damaging the tight core. FIG. 5 illustrates a second control displacement unit 60 operative to establish the desired longitudinal position of cutter 18.

Referring to FIGS. 5-8, second control displacement unit 60 is operative to controllably displace top portion 14 carrying cutter 18 (FIG. 6) relative to bottom portion 12. The unit 60 is configured with a split support 62 mounted to the proximal end of top side 34 of bottom portion 12 and having two spaced uprights 64. The uprights 64 are formed with respective aligned openings traversed by a grooved pin 66 which, in turn, extends through an opening 68 (FIG. 6) of a double ended eye bolt 70. The bolt 70 extends parallel to the longitudinal axis of bottom portion 12 and has its proximal end provided with a dial 72 (FIG. 5) which is operated in response to a torque applied thereto by the user. The opposite end of bolt 70 has a biasing mechanism operated to counteract the torque and biasing bottom portion 12 rearwards when top portion 14 (FIG. 7) is mounted to the bottom portion. The biasing mechanism is configured with a spring 74 braced against uprights 64 and a nut 76 mounted to the distal end of bolt 70.

The top portion 14 (FIG. 7) has a recess 78 formed in its proximal or rear end and configured so that, when top portion 14 is placed on bottom portion 12, dial 72 extends beyond the proximal end of top portion 14 to be conveniently operated by the user. After top portion 14 has been coupled to bottom portion 12, nut 76 is coupled to top portion 14, as better illustrated in FIG. 8, and operative to resist displacement of bottom and top portions 12 and 14, respectively, relative to one another in response to the torque. When, for example, dial 72 is rotated clockwise, top portion 14 along with cutter 18 are displaced slightly rearwards and remain fixed until and unless dial 72 is again actuated. To produce uniform splits on the opposite ends of the cable, it is important that a distance between the cutting blade lowered to its cutting position and a cable support 80 (FIG. 5) maintain uniform during processing of the opposite ends of the cable. The second displacement control unit 60 allows the user to meet this condition in a precise manner.

In use, the cutting device 10 functions in the following manner. Knowing the outer diameter of the cable to be processed, the user selects whether to use adapter 20 (FIG. 1) or not. If the adapter is needed, the user slides it forward within bottom portion 12 and, then, mounts a cable in cable receiving space 24. During a visual inspection, the user determines whether the cable is not in the desired position, and if the position needs to be adjusted, the user actuates set screw 52 (FIG. 3) so as to adjust the desirable lateral position. Subsequently, the user determines if a longitudinal position of cutter 18 is established and, if not, the user actuates dial 72 (FIG. 5) displacing the top and bottom portions 14 and 12, respectively, relative to one another. Furthermore, if the depth of blade penetration, which is set up initially by cut stop 54, is not satisfactory, shim stop 56 (FIG. 4) is displaced so that the desirable position is reached. When the device is ready to produce a cut, the user wraps his/her hand around top portion 14 and handle 16 and applies a compression force sufficient to bring the cutter 18 to a cutting position where its splits the cable in response to actuation of handle 22. As cutter lowers through aligned slits 26 and 50 of bottom portion 12 and adapter 20, top portion 12 is resiliently supported by a damping unit 90 (FIG. 5) preventing rapid penetrations of cutter 18 into the shield of the cable.

Accordingly, inventive device 10 allows for simple structure capable of selectively processing the cables of different sizes while providing the desire positions of cable and cutter relative to one another in a user-friendly manner.

While the invention has been described in conjunction with specific embodiments, it is to be understood that many alternatives, modifications and variations will be apparent to those skilled in the art in light of the foregoing description without departing from scope of the invention as recited in the following claims.

The invention claimed is:

1. A cutting device for splitting a shield of a cable, comprising:
    an elongated casting having a longitudinal axis and configured with top and bottom portions which are pivotally coupled to one another, the bottom portion being configured to receive the cable;
    a cutter coupled to the top portion of the casting and displaceable therewith towards a cutting position so as to split the shield of the cable upon actuation of the cutter; and
    an adapter insertable on the bottom portion so as to axially slide therealong in response to an external force, the adapter being configured to receive the cable in a predetermined position thereof in which the cable is centered relative to the cutter;
    one or more frictions elements configured to generate friction with the adapter during the sliding motion thereof; and
    an adjustable screw coupled to the bottom portion so as to cause the adapter to move laterally on the bottom upon displacing the adapter to the predetermined position.

2. The cutting device of claim 1, wherein the adapter is removably mounted to the bottom portion of the casting and configured to receive and displace the cable laterally relative to a longitudinal axis of the casting to the predetermined position of the cable.

3. The cutting device of claim 2, further comprising a first displacement control unit coupled to one of opposing surfaces of the bottom and top portions of the casting, respectively, the first displacement control unit including a shim stop rotatably slidable between extreme positions thereof and operable to control a depth of penetration of the cutter into a shield of the cable.

4. The cutting device of claim 3, wherein the first displacement control unit further includes a screw mounted to the top portion and displaceable towards the bottom portion so as to press against the shim stop in one of the positions of the shim stop thereby allowing the cutter to penetrate the shield at a first depth, and to press against a surface of the bottom portion facing the top portion upon rotating the shim stop to another position in which the cutter penetrates the shield at a second depth greater than the first depth.

5. The cutting device of claim 4, further comprising a biasing unit coupled to the bottom portion of the casting and operative to bias the top and bottom portions away from one another.

6. The cutting device of claim 1, further comprising a clamping handle having a distal end thereof pivotally mounted to an underside of the bottom portion of the caster, the clamping handle being provided with a cable stopper controllably penetrating the bottom portion so as to prevent displacement of the cable relative to the casting.

* * * * *